US011360783B2

(12) United States Patent
Wu (10) Patent No.: US 11,360,783 B2
(45) Date of Patent: Jun. 14, 2022

(54) METHOD AND SYSTEM FOR BOOTING FROM A SPLIT BIOS IMAGE (71) Applicant: Quanta Computer Inc., Taoyuan (TW)

(72) Inventor: Feng-Chou Wu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/728,960

(22) Filed: Dec. 27, 2019

(65) Prior Publication Data
US 2021/0200555 A1 Jul. 1, 2021

(51) Int. Cl.
*G06F 9/44* (2018.01)
*G06F 9/4401* (2018.01)

(52) U.S. Cl.
CPC .......... *G06F 9/4406* (2013.01); *G06F 9/4416* (2013.01)

(58) Field of Classification Search
None
See application file for complete search history.

(56) References Cited

U.S. PATENT DOCUMENTS

| 6,892,297 | B1* | 5/2005 | Aguilar | G06F 8/65 713/1 |
| 2006/0020837 | A1* | 1/2006 | Rothman | G06F 9/4416 713/310 |
| 2008/0005549 | A1* | 1/2008 | Ke | G06F 12/0802 713/1 |
| 2018/0267920 | A1* | 9/2018 | Lin | G06F 9/4401 |
| 2019/0095377 | A1* | 3/2019 | Brown | G06F 13/4286 |
| 2020/0348946 | A1* | 11/2020 | Pant | G06F 9/4416 |

* cited by examiner

*Primary Examiner* — Fahmida Rahman
(74) *Attorney, Agent, or Firm* — Nixon Peabody LLP (57) ABSTRACT

A system and method for booting a computer system is disclosed. Code is loaded from a minor BIOS image stored on an electrically erasable programmable read-only memory (EEPROM) to a cache of a central processing unit. The central processing unit executes the code from the minor BIOS image to initialize a system memory. A major BIOS image is accessed from a remote site via a controller. Code from the major BIOS image is loaded to the system memory. The code from the major BIOS image is executed via the central processing unit to boot an operating system.

20 Claims, 5 Drawing Sheets

METHOD AND SYSTEM FOR BOOTING FROM A SPLIT BIOS IMAGE

TECHNICAL FIELD

The present disclosure relates generally to power-up routines for computing devices. More particularly, aspects of this disclosure relate to a system that boots from at least one of multiple remote basic input output system (BIOS) images.

BACKGROUND

Servers are employed in large numbers for high demand applications such as network based systems or data centers. The emergence of the cloud for computing applications has increased the demand for data centers. Data centers have numerous servers that store data and run applications accessed by remotely-connected, computer device users. A typical data center has physical chassis structures with attendant power and communication connections. Each rack may hold multiple computing servers and storage servers. Each individual server is typically powered-up with a power-on self-test (POST) routine to begin operation. During a POST routine for a computer system, such as a processor core on a server, the basic input output system (BIOS) is executed by the processor core to initialize the hardware of the server.

BIOS firmware (the BIOS image) is typically stored on a Serial Peripheral Interface (SPI) EEPROM on the motherboard of a server. The available space to store the BIOS image depends on the capacity of an EEPROM as per the hardware design. This limits the BIOS image size by the memory capacity of SPI EEPROM. Such limitations mean that there is a finite capacity to add modules or drivers to the stored BIOS firmware. Thus, the extension of features for BIOS firmware that may be incrementally added is constrained.

In order to increase flexibility, hardware designs may use two SPI EEPROMs to store multiple BIOS images for different situations requiring different features. Such a configuration allows the use of the larger EEPROM of the two EEPROMS to contain the larger BIOS firmware. However, the additional EEPROM will increase the cost of the hardware. Furthermore, the size of EEPROM is still limited for BIOS image storage if more BIOS images are desirable.

Upgrading or downgrading BIOS firmware is a complex process and requires 3 to 6 minutes depending on the size of the EEPROM. For a server system, upgrading BIOS is usually processed via a baseboard management controller (BMC). For such upgrades, the server manager needs to shut down the system; load the upgraded BIOS image into the BMC; erase the BIOS EEPROM; and then write the upgraded BIOS image into the EEPROM. When the upgrade is finished, the server manager needs to power-on the system to confirm if the BIOS upgrade is successful. Since the upgrade of BIOS firmware is complex and inflexible, BIOS upgrades currently only occur when a serious problem occurs. Especially for installations with numerous servers, such as a data center, BIOS firmware updates require significant amounts of time, therefore causing server service to be suspended. Delays in server availability are undesirable, as any delay increases the time a user must wait to complete tasks such as data processing or application execution. Such delays multiplied over the large numbers of servers in a data center can impede overall operation of the data center.

Figure 1:
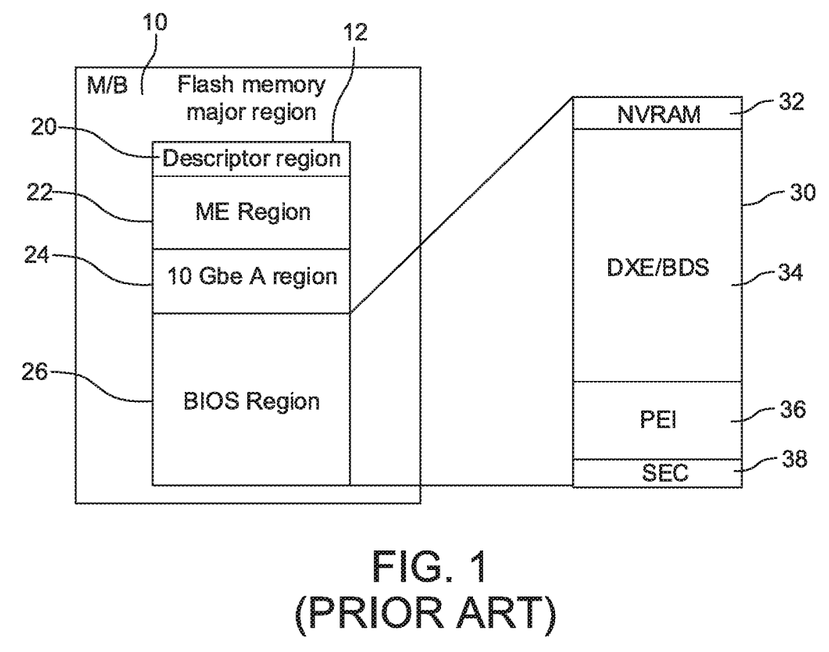
FIG. 1 is a prior art structure of a BIOS image stored on an EEPROM of a flash memory.

FIG. 1 is a prior art structure of a BIOS image stored on an EEPROM of a flash memory 12 on a motherboard 10. The flash memory 12 is divided into a descriptor region 20, a management engine (ME) region 22, a 10GBE A region 24, and a BIOS region 26. The descriptor region 20 includes description information for the BIOS image. The ME region 22 stores code for an embedded management controller. The 10 GBE A region 24 stores code for a 10 GbE controller for a platform control hub (PCH). The BIOS region 26 stores a BIOS image 30.

The BIOS image 30 includes a non-volatile RAM (NVRAM) region 32 for storing data. The BIOS image 30 also includes a driver execution environment/boot device selection (DXE/BDS) area 34, a pre-EFI initialization (PEI) area 36, and a security (SEC) area 38. Each of the areas 34, 36, and 38 store code for executing respective different BIOS functions of execution environment/boot device selection, pre-EFI initialization and authentication.

Figure 2:
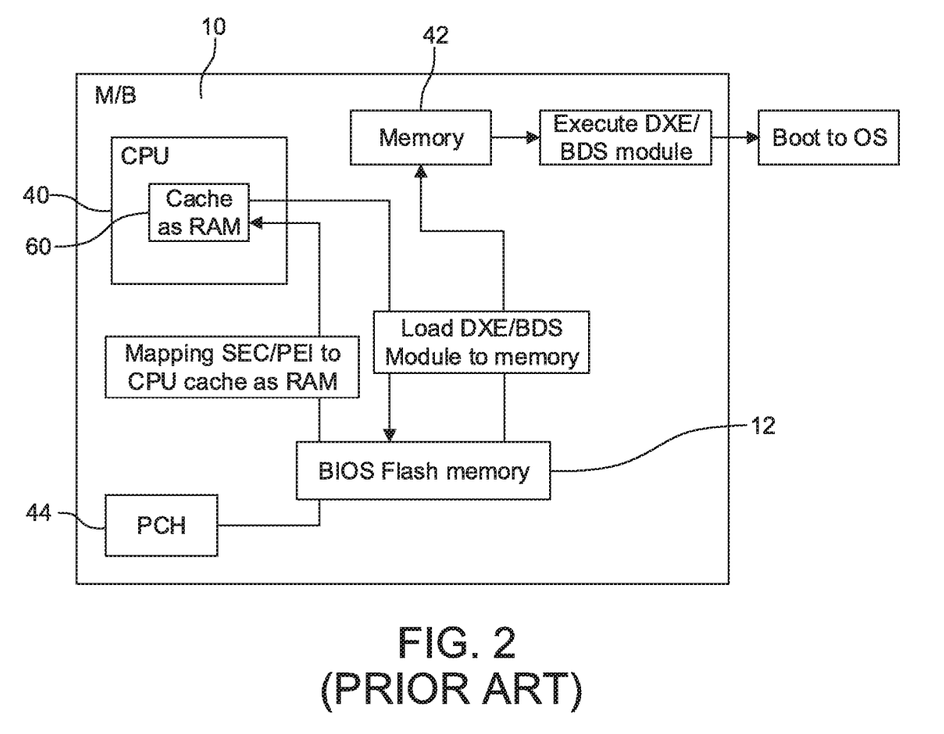
FIG. 2 is a prior art hardware diagram of the components used in a boot-up process using the BIOS.

FIG. 2 is a prior art hardware diagram of the components used in a boot-up process using the BIOS. FIG. 2 thus shows different components of the motherboard 10 in FIG. 1 and the process of booting from the BIOS image in the flash memory 12. The motherboard 10 includes a CPU 40, a system memory 42, a platform hub controller (PCH) 44, and the BIOS flash memory 12.

The boot process begins when the system is powered on. The PCH 44 maps the security and pre-EFI initialization (SEC/PEI) code from the BIOS image on the flash memory 12 to an internal cache 60 of the CPU 40. The CPU 40 uses the internal cache 60 as random access memory (RAM) to execute the SEC/PEI code. The BIOS loads the remaining code (DXE/BDS) from the SPI EEPROM of the flash memory 12 into the system memory 42. The CPU 40 then executes the remaining BIOS code on the system memory 42 until the power on self-test (POST) routines ends and the BIOS boots to the operating system (OS). The BIOS code for such prior art systems is constrained by the size of the EEPROM on the flash memory 12. Thus, updates for the BIOS code cannot be readily adopted. Further, other BIOS images cannot be used because of space constraints.

Thus, there is a need for a system that includes a motherboard that may be used in a series of products, with no need to update the BIOS on the motherboard. There is a need for a system that does not require a larger EEPROM as the firmware of the BIOS increases in size. There is also a need for unified control of the BIOS firmware version via a baseboard management controller regardless of the BIOS version on the motherboard. There is a further need for a system that allows different BIOS images to be used.

SUMMARY

One disclosed example is a system including an electrically erasable programmable read-only memory (EEPROM) storing a minor BIOS image. The system includes a system memory and a central processing unit having a cache. The central processing unit is operable to execute code from the minor BIOS image on the cache to initialize the system memory. A remote site stores a major BIOS image. A controller loads code from the major BIOS image to the system memory. The central processing unit executes the code from the major BIOS image to boot an operating system.

A further implementation of the example system is where the controller is a baseboard management controller. Another implementation is where the major BIOS image is selected from one of a plurality of major BIOS images stored at the remote site. Another implementation is where the remote site is a controller accessible memory. Another implementation is where the remote site is a network accessible device coupled via a network to the controller. Another implementation is where the minor BIOS image supports one of a plurality of different modes that boot the operating system if communication to the controller is not established. Another implementation is where the minor BIOS image includes a driver execution environment/boot device selection (DXE/BDS) area, and the central processing unit is operable to load code from the DXE/BDS area of the minor BIOS image if communication to the controller is not established. Another implementation is where the minor BIOS image includes a non-volatile random access memory area, a pre-EFI initialization (PEI) area, and a security area. Another implementation is where the major BIOS image includes a driver execution environment/boot device selection (DXE/BDS) area. Another implementation is where the major BIOS image is one of a BIOS version for a generation of the CPU, a debug BIOS version, a test BIOS version, a special BIOS version, or a BIOS patch.

Another disclosed example is a method for booting a computer system is disclosed. Code is loaded from a minor BIOS image stored on an electrically erasable programmable read-only memory (EEPROM) to a cache of a central processing unit. The central processing unit executes the code from the minor BIOS image to initialize a system memory. A major BIOS image is accessed from a remote site via a controller. Code from the major BIOS image is loaded to the system memory. The code from the major BIOS image is executed via the central processing unit to boot an operating system.

Another implementation of the example method is where the controller is a baseboard management controller. Another implementation includes selecting the major BIOS image from one of a plurality of major BIOS images stored at the remote site. Another implementation is where the remote site is a controller accessible memory. Another implementation is where the remote site is a network accessible device coupled via a network to the controller. Another implementation is where the minor BIOS image supports a mode to boot the operating system if loading the code from the major BIOS image fails. Another implementation includes determining if communication to the controller is not established; and executing driver execution environment/boot device selection (DXE/BDS) from a DXE/BDS area of the minor BIOS image. Another implementation is where the minor BIOS image includes a non-volatile random access memory area, a pre-EFI initialization (PEI) area, and a security area. Another implementation is where the major BIOS image includes a driver execution environment/boot device selection (DXE/BDS) area. Another implementation is where the major BIOS image is one of a BIOS version for a generation of the CPU, a debug BIOS version, a test BIOS version, a special BIOS version, or a BIOS patch.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The examples disclosed herein include a system and method to increase capacities of a BIOS image on a computer system. The disclosed system also simplifies the BIOS upgrade process. The disclosed example system separates the BIOS image into two parts. The major part of the BIOS image is stored on a remote site from the computer system. Thus, the major part of the BIOS image is loaded from a remote site on each power on of the system. The minor part of the BIOS image is stored on an SPI EEPROM on the motherboard of the computer system. In this example, the major part of the BIOS image stores most of the functional modules and drivers, such as the BIOS DXE/BDS codes, that may be loaded to a system memory. The minor part of the BIOS images stores basic CPU/MEMORY initial codes, such as BIOS SEC/PEI codes, that may be loaded to an internal CPU cache for execution.

The disclosed system stores the minor part of the BIOS on the SPI EEPROM. Storage of the minor part of the BIOS results in less hardware coordination required for BIOS updates, thereby avoiding having to change the current power-on sequence. A pure software based design for the major parts of the BIOS can insure the described concepts may be implemented on next generation platforms.

To make the execution of the BIOS image more flexible, the major part of the BIOS image is loaded from the baseboard management controller (BMC) side of the system remotely. The BMC side has available memory to store multiple BIOS images that may be provided during the boot process. Thus, the host system can load the specific BIOS version desired via the BMC. With multiple BIOS images, the host system can easily switch the BIOS version to a desired specific BIOS image without a general BIOS upgrade procedure that takes additional time. The BIOS images in the BMC available memory may be managed in advance. Such BIOS images just take another arrangement in the reboot of the host system. The host system will load the specific BIOS from the next boot. This process avoids the long times current firmware upgrades require. The "remote site" may be any device or system which supports the capability of network communication with the BIOS of the host system.

The system described herein uses a BMC shared memory as the remote site. The BMC shared memory is suitable for implementing the described principles. The BIOS initializes the system memory at a very early stage. When the system memory is initialized, the remaining major BIOS modules can be loaded into the system memory from the BMC shared memory. Thus, boot up may be achieved without modifying an excessive amount of BIOS content.

Loading the remaining modules from the remote site instead of loading them from the EEPROM, after the BIOS has finished initializing the memory, allows greater flexibility and efficiency. This part of the modification can be done by the BIOS itself, without hardware modifications. In the early stages of the BIOS startup, network initialization occurs and specifies which network address to load the remaining BIOS modules. The BMC shared memory may also be used to directly achieve the same effect without having to initialize the network in advance.

Figure 3:
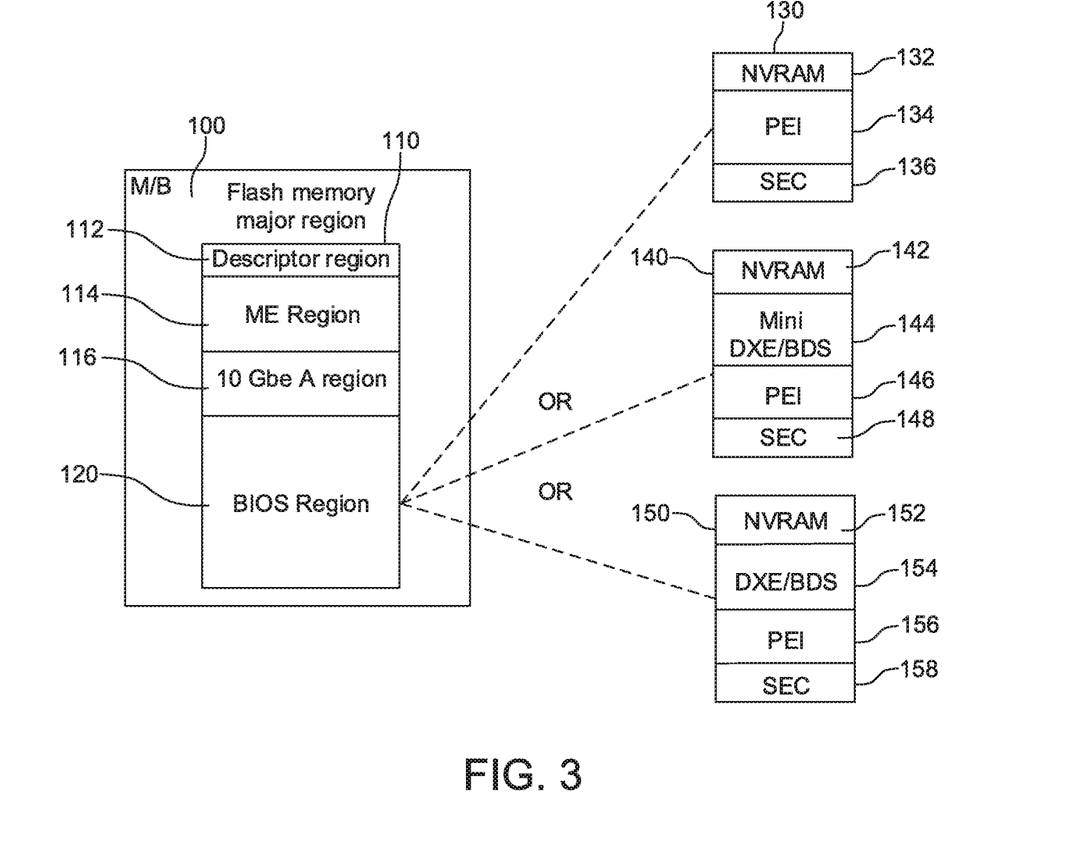
FIG. 3 shows a motherboard with a system flash memory that may include the reduced or minor BIOS image, according to certain aspects of the present disclosure.
Figure 4:
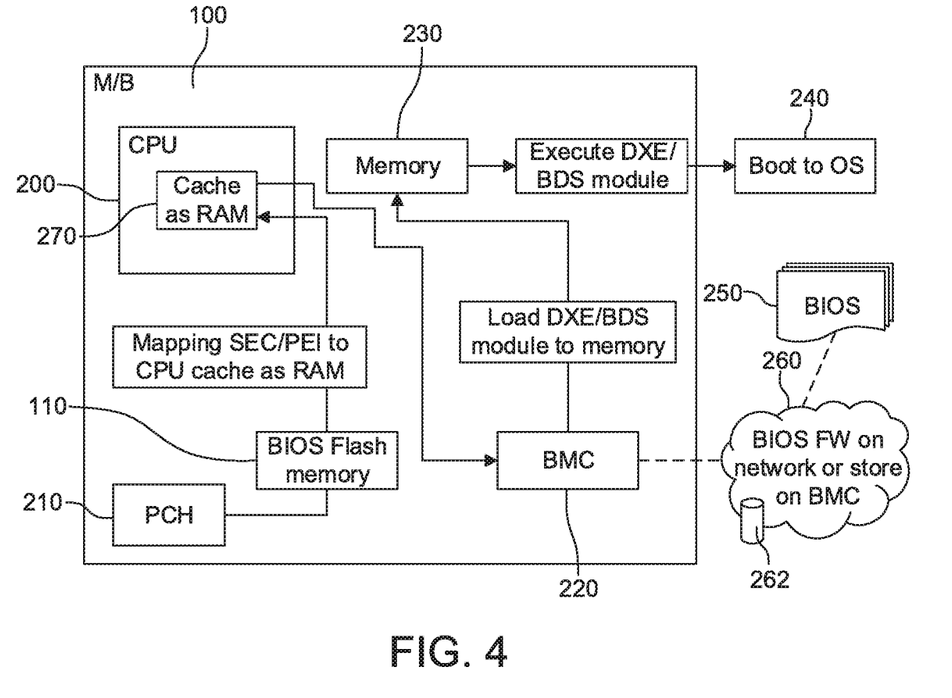
FIG. 4 is a hardware diagram of the components allowing boot up from one of multiple BIOS major images, according to certain aspects of the present disclosure.

FIG. 3 shows a motherboard 100 with a system flash memory 110 that may include the reduced or minor BIOS image. FIG. 4 is a hardware diagram of the components allowing boot up from one of multiple BIOS major images on the motherboard 100. The motherboard 100 includes a CPU 200, a platform controller hub (PCH) 210, a baseboard management controller (BMC) 220, and a system memory 230. An operating system 240 is provided to operate the host system of motherboard 100 after it is booted. A remote site may be provided with different major BIOS images 250 that are accessible by the BMC 220. The remote site may be either a device accessible by a network 260 accessible by the BMC 220 or a shared BMC memory 262. In this configuration, the system manager may load the major portion of the BIOS image into the shared BMC memory 262 as one option. The major portion of the BIOS image may be stored in a network device such as a storage server or an FTP server. When the BMC shared memory 262 is enabled, the BIOS and BMC 220 will allocate a memory region on both the system memory 230 and the BMC shared memory 262. Access to the memories 230 and 262 will be synced to each other. As shown in FIG. 4, the CPU 200 includes a cache 270 that acts as random access memory. The flash memory 110 and system memory 230 are accessible to the CPU 200 for execution of the BIOS code.

As shown in FIG. 3 the flash memory 110 is divided into a descriptor region 112, a management engine (ME) region 114, a 10GBE A region 116, and a BIOS region 120. FIG. 3 shows three potential minor BIOS images 130, 140, and 150 that may be stored in the BIOS region 120. The improved BIOS structure may have one of three modes: an empty mode, a mini-mode and a traditional mode. Each of the three modes is associated with one of the separate minor BIOS images 130, 140, and 150. Thus, the mode used by the system depends on which of the minor images 130, 140, or 150 is stored in or read from the flash memory 110. The difference between these three modes is the response method provided when system fails to load the major BIOS image stored in the remote site.

In the empty mode, the empty mode minor BIOS image 130 is stored in the flash memory 110. The BIOS image 130 includes a non-volatile RAM (NVRAM) region 132 for storing data. The BIOS image 130 also includes a pre-EFI initialization (PEI) area 134, and a security (SEC) area 136. When in the empty mode, only the NVRAM, and SEC/PEI areas 132, 134, and 136 are stored on the EERPOM of the flash memory 110. The SEC/PEI code in the SEC/PEI areas 134 and 136 are used to initialize the CPU 200 and the system memory 230. The NVRAM 132 is used to store the variable values of the BIOS. The minor BIOS image does not include DXE/BDS code stored in the EEPROM 110. In the empty mode, if the system fails to load the remote major BIOS image, the system will not boot properly. The advantage is that the system can choose the smallest EEPROM space, because the empty minor BIOS image 130 only takes up a small amount of space on the EEPROM of the flash memory 110.

In the mini-mode, the mini-mode minor BIOS image 140 is stored in the flash memory 110. The mini-mode minor BIOS image 140 includes a non-volatile RAM (NVRAM) area 142, a driver execution environment/boot device selection (DXE/BDS) area 144, a pre-EFI initialization (PEI) area 146, and a security (SEC) area 148. The mini-mode uses the minimum amount of DXE/MBDS code from the DXE/BDS area 144 to give the system the basic ability to boot to either the operating system 240 (in FIG. 4) or a BIOS shell. If the major BIOS image fails to load from a remote site, such as the remote site in FIG. 4, the system can send a simple response in the operating system or BIOS shell. For example, when the firmware of the BMC 220 (in FIG. 4) is damaged, the system can repair the BMC 220 in the operating system or BIOS shell environment. In the operating system or BIOS, basic instructions or programs can also be used to determine the cause of the remote load failure.

In the traditional mode, the structure of the traditional mode minor BIOS image 150 stored on the EEPROM of the flash memory 110 is similar to currently used BIOS images. The traditional mode minor BIOS image 150 includes a non-volatile RAM area 152, a driver execution environment/boot device selection (DXE/BDS) area 154, a pre-EFI initialization (PEI) area 156, and a security (SEC) area 158. Thus, the minor BIOS image 150 is a full BIOS version stored on the EEPROM of the flash memory 110. This BIOS version can be either the original version from the manufacturer or a trusted version that has been verified by the user. When the remote major BIOS image fails to load from the remote site such as the network or the BMC shared memory 262 (in FIG. 4), the system will continue to boot directly using the BIOS image 150 on the flash memory 110. In this mode, even if the major BIOS image fails to load from the BMC 220, the system can still boot completely and normally. The only difference is that the BIOS version on the flash memory 110 may not be the latest BIOS version. The user can choose to burn the stable and reliable BIOS version as the BIOS image 150 to the flash 110 to ensure that the system can boot from the trusted BIOS version under all conditions.

In this example, the BIOS image on the EEPROM of the flash memory 110 can be updated. The update is done in the same way as current BIOS update are burned. In general, the empty mode and mini-mode BIOS images 130 and 140 do not need to be updated unless the BIOS image has a serious bug in the SEC/PEI code. Under the traditional mode, a system manager may test new versions of the BIOS without having to burn the new version into the EEPROM of the flash memory 110. The system manager can easily test the new version of the BIOS on all the machines by loading the new version of the BIOS from the remote site. The new version of the BIOS may then be burned into the flash memory 110 as the traditional mode BIOS image 150 after confirming that the new BIOS version is stable and trusted.

As shown in FIG. 4, the power-on process may use both the minor BIOS image from the flash memory 110 and the major BIOS image from the remote site managed by the BMC 220. On power-up, the PCH 210 causes the SEC/PEI code from the respective BIOS image 130, 140, or 150 stored on the EEPROM of the flash memory 110 to be mapping to the CPU cache 270. The CPU 200 uses the cache 270 as RAM to execute the mapped SEC/PEI code and initialize the system memory 270. The BIOS will then load the remaining code (DXE/BDS) from a BIOS image stored on a remote site into the system memory 230. In this example, the remaining code is obtained from one of the major BIOS images 250 selected by the BMC 220 from the shared memory 262. The CPU 200 then executes the remaining BIOS code on the system memory 230 until the power-on self-test routine ends, and the operating system 240 is booted.

Figure 5:
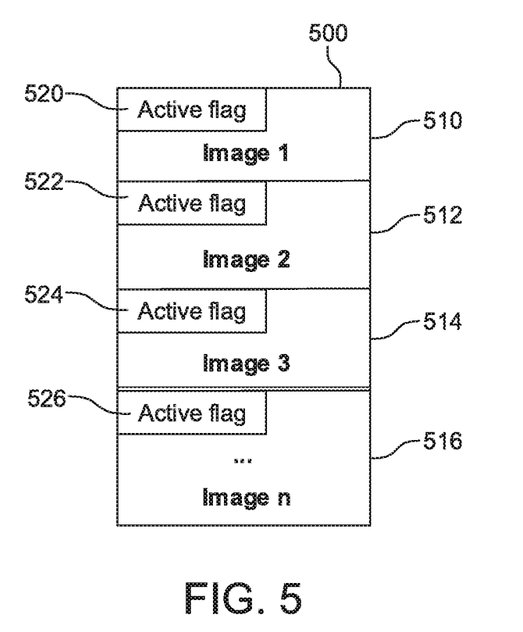
FIG. 5 is a memory map of the BMC shared memory storing multiple BIOS images, according to certain aspects of the present disclosure.

FIG. 5 shows a memory map 500 of the shared BMC memory 262 storing the multiple BIOS images 250 in FIG. 4. The shared memory 262 includes multiple BIOS images including different BIOS images 510, 512, 514, and 516. The BMC 220 in FIG. 4 will prepare the different BIOS images for the system to boot. The setting of "Load BIOS images into share memory" can be a parameter inside the BMC 220, or the system manager can manually control the path and quantity of loading via an interface. There may be one or more BIOS images prepared by the BMC 220. Each of the BIOS images 510, 512, 514 and 516 includes a corresponding active flag 520, 522, 524, and 526 in the header of the corresponding BIOS image. The flags 520, 522, 524, and 526 are set to indicate which BIOS image the BMC 220 should load.

Examples of BIOS images that may be available as one or the BIOS images 510, 512, 514 and 516 includes a BIOS for a first generation CPU, version 3A01, 3A02, etc., a BIOS for a second generation CPU, version 3B01, 3B02, etc., a debug version BIOS, a test version BIOS, a special version BIOS, and a BIOS patch for a workaround from an issue, and a BIOS that adds or removes some features which need to enabled or disabled on build time.

Figure 6A:
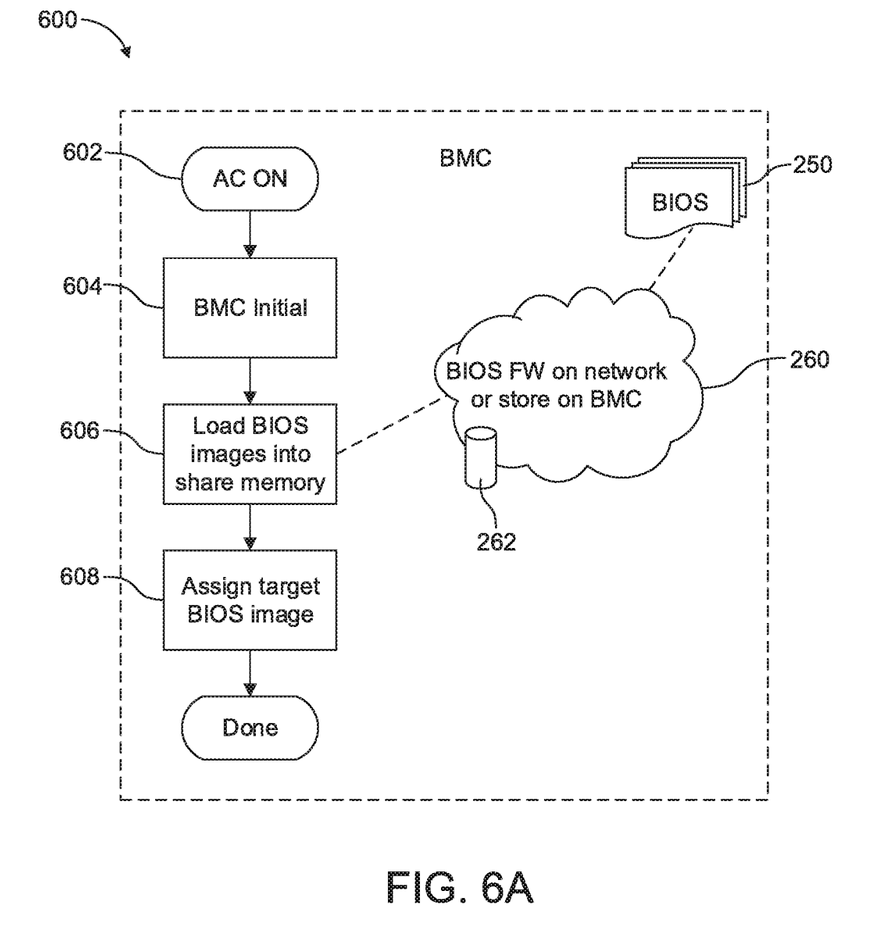
FIG. 6A is a flow diagram of an example routine executed by the BMC to provide one of several BIOS images, according to certain aspects of the present disclosure.
Figure 6B:
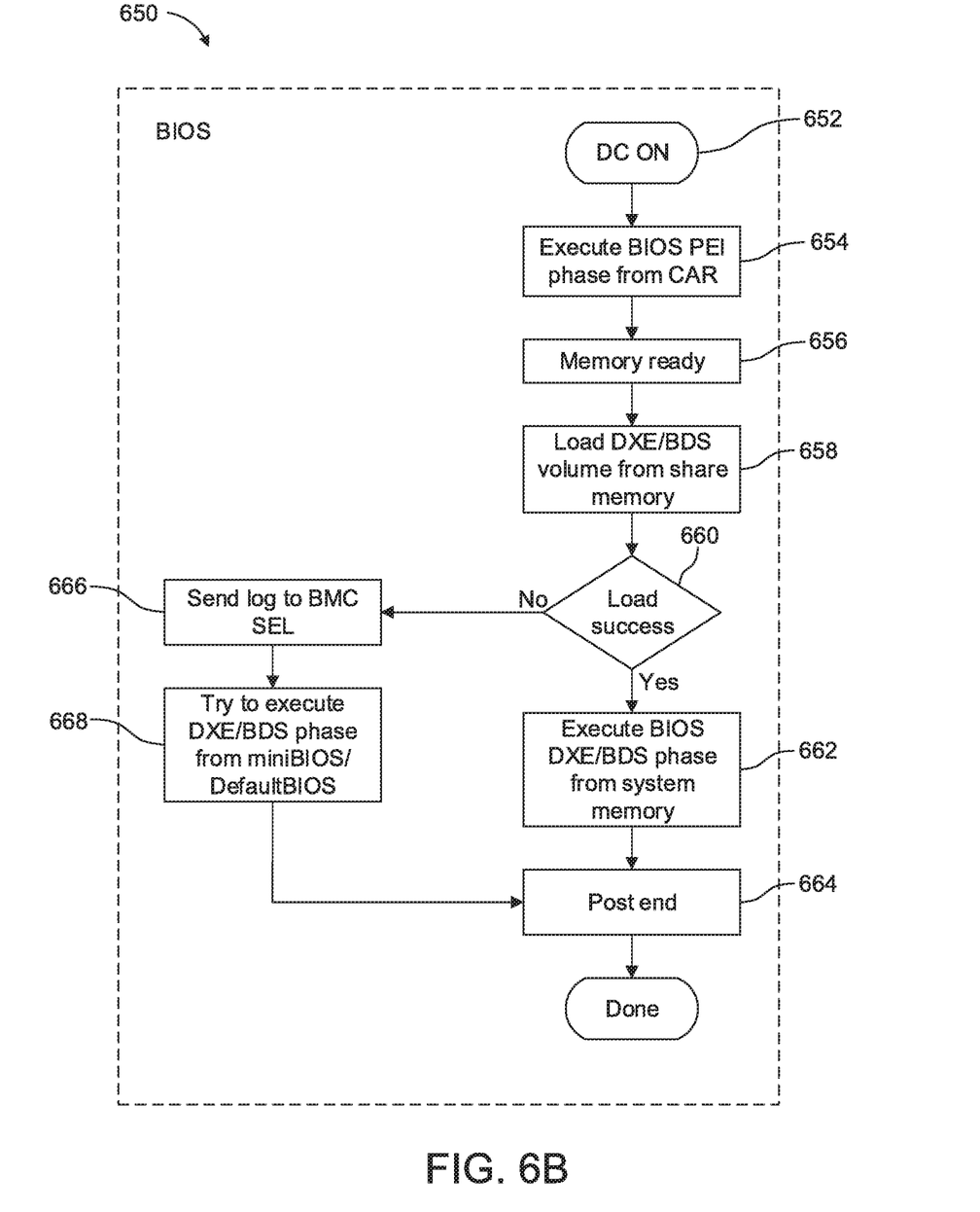
FIG. 6B is a flow diagram of an example routine executed by the host system during a power up self-test routine, according to certain aspects of the present disclosure.

The improved process will proceed as follows in relation to the routines shown in FIGS. 6A-6B. FIG. 6A is a flow diagram 600 of an example routine executed by the BMC to provide one of several BIOS images according to certain aspects of the present disclosure. FIG. 6B is a flow diagram 650 of an example routine executed by the host system during a power-up self-test routine according to certain aspects of the present disclosure.

The flow diagrams in FIGS. 6A-6B are representative of example machine readable instructions for the process of providing different BIOS images from a remote site by a BMC. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 6A-6B, persons of ordinary skill in the art will readily appreciate that many other methods of implementing the example machine readable instructions may alternatively be used. For example, the order of execution of the blocks may be changed, and/or some of the blocks described may be changed, eliminated, or combined.

As shown in FIG. 6A, AC power is first turned on (602). After the mother board 100 is connected to AC power, the BMC such as the BMC 220 starts to initialize (604). After the BMC is ready, the major BIOS images, such as the major BIOS images 250, will be loaded into the BMC shared memory, such as the shared memory 262, or in a network device as shown in FIG. 4, from the specified memory locations according to the settings made by the user (606). The BMC 220 the assigns a target major BIOS image based on the active flag from the different BIOS images (608).

As shown in FIG. 6A, AC power is first turned on (602). After the motherboard 100 is connected to AC power, the BMC such as the BMC 220 starts to initialize (604). After the BMC is ready, the major BIOS images, such as the major BIOS images 250, will be loaded into the BMC shared memory, such as the shared memory 262, or in a network device as shown in FIG. 4, from the specified memory locations according to the settings made by the user (606). The BMC 220 then assigns a target major BIOS image based on the active flag from the different BIOS images (608).

The BIOS determines whether the loading of the BIOS image was successful in step 660. If the load is successful, the DXE/BDS code is executed from the loaded major BIOS image from the BMC (662). The power-on self-test routine then ends (664). If loading the BIOS image fails in step 660, a log event is recorded and sent to the BMC (666). The routine then attempts to perform the mini mode or traditional mode error handling by executing the DXE/BDS from either the minor image 140, or the minor image 150 in FIG. 3 stored in the flash memory (668). The routine then loops to end the power-on self-test routine (664). If the minor image 130 in FIG. 3 is stored in the flash memory, the routine ends without completing the boot up routine.

The system described herein allows a single motherboard to be used in the same series of products as there is no need to update the BIOS when shipping. This saves inventory management and simplifying the manufactory shipping process. The remote BIOS images obviates the need to switch to a larger EEPROM as the BIOS firmware gets larger. Further, the BIOS firmware size is not limited by EEPROM. The BIOS images shared by multiple networked devices allow access to numerous different BIOS images.

Unified control of the BIOS firmware version by the BMC allows a system manager to focus solely on the management on the BMC. The system manager does not need to rely on the BIOS version on the motherboard. Changing the BIOS version is rapid as new major BIOS images may be loaded to the BMC shared memory. This provides a convenient method for controlling the BIOS version in a data center for multiple servers. The BMC access to multiple BIOS images allows flexibility in selecting different BIOS images and versions at boot time.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system comprising:
    an electrically erasable programmable read-only memory (EEPROM) storing a minor BIOS image;
    a system memory;
    a central processing unit including a cache, the central processing unit coupled to the EEPROM and the system memory, the central processing unit operable to execute code from the minor BIOS image on the cache to initialize the system memory during a start-up process of the system wherein the minor BIOS image includes code with an ability to boot an operating system; and
    a controller configured to attempt to load code from a major BIOS image stored at a remote site to the system memory in response to the successful completion of the execution of the entire code from the minor BIOS image except the code with the ability to boot the operating system, wherein the central processing unit executes the code from the major BIOS image loaded in the system memory to boot an operating system if the attempt to load the code from the major BIOS image from the remote site is successful, and wherein the central processing unit executes the code with the ability to boot the operating system of the minor BIOS image if the attempt to load code from the major BIOS image is unsuccessful.

2. The system of claim 1, wherein the controller is a baseboard management controller.

3. The system of claim 1, wherein the major BIOS image is selected from one of a plurality of major BIOS images stored at the remote site.

4. The system of claim 1, wherein the remote site is a controller accessible memory.

5. The system of claim 1, wherein the remote site is a network accessible device coupled via a network to the controller.

6. The system of claim 1, wherein the minor BIOS image supports one of a plurality of different modes, one of the different modes booting the operating system if communication to the controller is not established.

7. The system of claim 1, wherein the minor BIOS image includes a driver execution environment/boot device selection (DXE/BDS) area, and wherein the central processing unit is operable to load code from the DXE/BDS area of the minor BIOS image if communication to the controller is not established.

8. The system of claim 1, wherein the minor BIOS image includes a non-volatile random access memory area, a pre-EFI initialization (PEI) area, and a security area.

9. The system of claim 1, wherein the major BIOS image includes a driver execution environment/boot device selection (DXE/MBDS) area.

10. The system of claim 1, wherein the major BIOS image is one of a BIOS version for a generation of the CPU, a debug BIOS version, a test BIOS version, a special BIOS version, or a BIOS patch.

11. The system of claim 1, wherein the code with the ability to boot the operating system of the minor BIOS image is a driver execution environment/boot device selection (DXE/MBDS) code.

12. A method of booting a computer system, the method comprising:
- loading code from a minor BIOS image stored on an electrically erasable programmable read-only memory (EEPROM) to a cache of a central processing unit, wherein the minor BIOS image includes code with an ability to boot an operating system;
- executing the code from the minor BIOS image to initialize a system memory during a start-up process of the computer system;
- attempting to access a major BIOS image to load to the system memory from a remote site via a controller in response to the successful completion of the execution of the entire code of the minor BIOS image except the code with the ability to boot the operating system;
- determining that the access to the major BIOS image is unsuccessful; and
- executing the code with the ability of the minor BIOS image to boot the operating system based on determining that the access to the major BIOS image from the remote site is unsuccessful, wherein the code with the ability to boot the operating system is configured to be executed only when the attempting to access the major BIOS image is unsuccessful.

13. The method of claim 12, wherein the controller is a baseboard management controller.

14. The method of claim 12, further comprising selecting the major BIOS image from one of a plurality of major BIOS images stored at the remote site.

15. The method of claim 12, wherein the remote site is a controller accessible memory.

16. The method of claim 12, wherein the remote site is a network accessible device coupled via a network to the controller.

17. The method of claim 12, further comprising:
- determining if communication to the controller is not established; and
- executing driver execution environment/boot device selection (DXE/BDS) from a DXE/BDS area of the minor BIOS image.

18. The method of claim 12, wherein the minor BIOS image includes a non-volatile random access memory area, a pre-EFI initialization (PEI) area, and a security area.

19. The method of claim 12, wherein the major BIOS image includes a driver execution environment/boot device selection (DXE/MBDS) area.

20. The method of claim 12, wherein the major BIOS image is one of a BIOS version for a generation of the CPU, a debug BIOS version, a test BIOS version, a special BIOS version, or a BIOS patch.

* * * * *